(12) United States Patent
Oberti et al.

(10) Patent No.: US 8,612,132 B2
(45) Date of Patent: Dec. 17, 2013

(54) METHOD AND SYSTEM FOR DETECTING POTENTIAL COLLISIONS BY AN AIRCRAFT

(75) Inventors: Michaël Oberti, Toulouse (FR); Elias Bitar, Tournefeuille (FR); Jean-François Neu-Faber, Blagnac (FR)

(73) Assignee: Rockwell Collins France, Blagnac (FR)

( * ) Notice: Subject to any disclaimer, the term of this patent is extended or adjusted under 35 U.S.C. 154(b) by 224 days.

(21) Appl. No.: 13/289,964

(22) Filed: Nov. 4, 2011

(65) Prior Publication Data
US 2012/0123671 A1 May 17, 2012

(30) Foreign Application Priority Data
Nov. 5, 2010 (FR) ...................................... 10 59134

(51) Int. Cl.
*G06F 17/10* (2006.01)
(52) U.S. Cl.
USPC ............... 701/301; 701/3; 701/300; 340/903; 340/435; 340/436
(58) Field of Classification Search
USPC ............ 701/3, 7, 36, 300, 301; 340/976, 978, 340/903, 435, 436, 438
See application file for complete search history.

(56) References Cited

U.S. PATENT DOCUMENTS

| 4,760,396 | A | 7/1988 | Barney et al. |
| 5,638,282 | A | 6/1997 | Chazelle et al. |
| 6,885,334 | B1 | 4/2005 | Hager et al. |
| 7,777,647 | B2 * | 8/2010 | Sallier et al. ................... 340/978 |
| 7,786,900 | B2 * | 8/2010 | Bitar et al. ..................... 340/976 |
| 8,200,377 | B2 * | 6/2012 | Marty et al. ....................... 701/3 |
| 2007/0031007 | A1 * | 2/2007 | Bitar ............................. 382/106 |

FOREIGN PATENT DOCUMENTS

| FR | 2868835 B1 | 11/2006 |
| FR | 2898425 A1 | 9/2007 |
| FR | 2932279 A1 | 12/2009 |
| WO | WO 01/11383 A1 | 2/2001 |

OTHER PUBLICATIONS

Preliminary Search Report for French Application No. 1059134, mail date May 27, 2011, 2 pages.

* cited by examiner

*Primary Examiner* — Gertrude Arthur Jeanglaude
(74) *Attorney, Agent, or Firm* — Foley & Lardner LLP

(57) ABSTRACT

Systems and methods for detecting potential collisions by an aircraft are disclosed. A set of points may be detected by one or more sensors of the aircraft. The set of points may be transformed based on the speed of the aircraft relative to a speed threshold. A potential collision may be detected based on whether a transformed point is within a protective envelope relative to the aircraft.

20 Claims, 8 Drawing Sheets

METHOD AND SYSTEM FOR DETECTING POTENTIAL COLLISIONS BY AN AIRCRAFT

PRIORITY

This application claims the benefit of priority to French Application Serial No. 10 59134, filed Nov. 5, 2010, and entitled, "Method and Device for Detecting Potential Collisions That Can Be Implemented in an Aircraft," which is hereby incorporated by reference in its entirety.

BACKGROUND

The present disclosure relates generally relates to the field of obstacle detection by an aircraft.

A growing share of CFIT (Controlled Flight Into Terrain) accidents over the last twenty years, both in civil and military aviation, has led to the development of systems for warning an aircraft's flight crew of a risk of collision with the ground. This trend has become more pronounced in the last ten years, with the requirement that civil aircrafts carrying more than fifteen people have TAWS systems (Terrain Awareness and Warning System). These TAWS systems predict the layout of the ground from the aircraft using flight computers, project that layout on a terrain elevation map resulting from an onboard database, and emit sound and visual alarms for risks of collision with the ground each time the anticipated trajectory collides with the elevation map.

In a TAWS system, the margin used to determine whether an aircraft risks colliding with an obstacle is a fixed margin. It is chosen to protect aircrafts moving at high speeds. As a result, when an aircraft moves at a low speed, TAWS systems generate many false alarms. Furthermore, TAWS systems based on an elevation database cannot protect the aircraft from risks of collision with obstacles in the actual environment, for example cables, pylons, towers, cranes, etc. In fact, these obstacles may not be exhaustively inventoried in a shared database updated worldwide.

In a TAWS system, obstacle detection is generally done by entering, a priori, a certain amount of obstacle information into a TAWS database in the form of reference points (generally in latitude/longitude coordinates), with an imposed geometry (cylinder, square) and an elevation value. This obstacle data is interpreted by the TAWS system as a local over-elevation of the terrain locally around the point. However, the terrain elevation database of a TAWS system may be broken down into rectangular cells having low resolution (approximately 3 arc seconds). Since the precision of the elevation detection done by the TAWS system depends on the size of the cell in which the reference point of the obstacle is located, the false alarm rate (because the system is conservative and prefers to provide alerts) may be high for obstacles.

Furthermore, in a TAWS system, the detection of potential collisions with obstacles is based on the validity and precision of the information recorded in the obstacle database. When this data is incorrect or obsolete, in particular in an environment having non-inventoried temporary obstacles, the effectiveness of such a collision detection system is reduced. A TAWS system may also be poorly adapted to aircrafts traveling at low speeds, as it is impossible to project their trajectories at low speeds. Furthermore, in that mode, the influence of wind on the aircraft becomes preponderant in assessing the danger relative to the obstacles and the TAWS system does not meet this need.

SUMMARY

One embodiment of the present disclosure relates to a method for detecting potential collisions by an aircraft, the aircraft being equipped with at least one sensor configured to supply data used to determine a distance and angle of an object detected by said sensor relative to a reference location of the aircraft. The method includes determining, by a processing circuit, a first set of points for obstacles detected by the at least one sensor and determining a union set of points as the union of the first sets of points. The method also includes determining a detection mode for detecting potential collisions based on at least the speed of the aircraft and a guiding mode of the aircraft. The method further includes determining a set of transformed points by applying a transformation to the union set of points. The transformation is selected based on the determined detection mode, the transformation being used to obtain the set of transformed points by adjusting the union set of points radially toward the reference location of the aircraft when the aircraft moves at a speed above a threshold speed. The method also includes calculating at least one protective envelope around the reference location of the aircraft based on the determined detection mode. The method further includes detecting a potential collision based on whether a transformed point is within a protective envelope.

Another embodiment is a system for detecting potential collisions by an aircraft. The system includes a processing circuit and at least one sensor configured to supply data to the processing circuit and used by the processing circuit to determine a distance and angle of an object detected by said sensor relative to a reference location of the aircraft. The processing circuit is further configured to determine a first set of points for obstacles detected by the at least one sensor and to determine a union set of points as the union of the first sets of points. The processing circuit is also configured to determine a detection mode for detecting potential collisions based on at least the speed of the aircraft and a guiding mode of the aircraft. The processing circuit is further configured to determine a set of transformed points by applying a transformation to the union set of points. The transformation is selected based on the determined detection mode and used to obtain the set of transformed points by adjusting the union set of points radially toward the reference location of the aircraft when the aircraft moves at a speed above a threshold speed. The processing circuit is additionally configured to calculate at least one protective envelope around the reference location of the aircraft based on the determined detection mode. The processing circuit is also configured to detect a potential collision based on whether a transformed point is within a protective envelope.

A further embodiment is a system for detecting potential collisions by an aircraft, the aircraft being equipped with at least one sensor configured to supply data used to determine a distance and angle of an object detected by said sensor relative to a reference location of the aircraft. The system includes means for determining a first set of points for obstacles detected by the at least one sensor and means for determining a union set of points as the union of the first sets of points. The system also includes means for determining a detection mode for detecting potential collisions based on at least the speed of the aircraft and a guiding mode of the aircraft. The system further includes means for determining a set of transformed points by applying a transformation to the union set of points. The transformation is selected based on the determined detection mode and is used to obtain the set of transformed points by adjusting the union set of points radially toward the reference location of the aircraft when the aircraft moves at a speed above a threshold speed. The system also includes means for calculating at least one protective envelope around the reference location of the aircraft based on the determined detection mode. The system further includes means for detecting a potential collision based on whether a transformed point is within a protective envelope.

DETAILED DESCRIPTION

Figure 1:
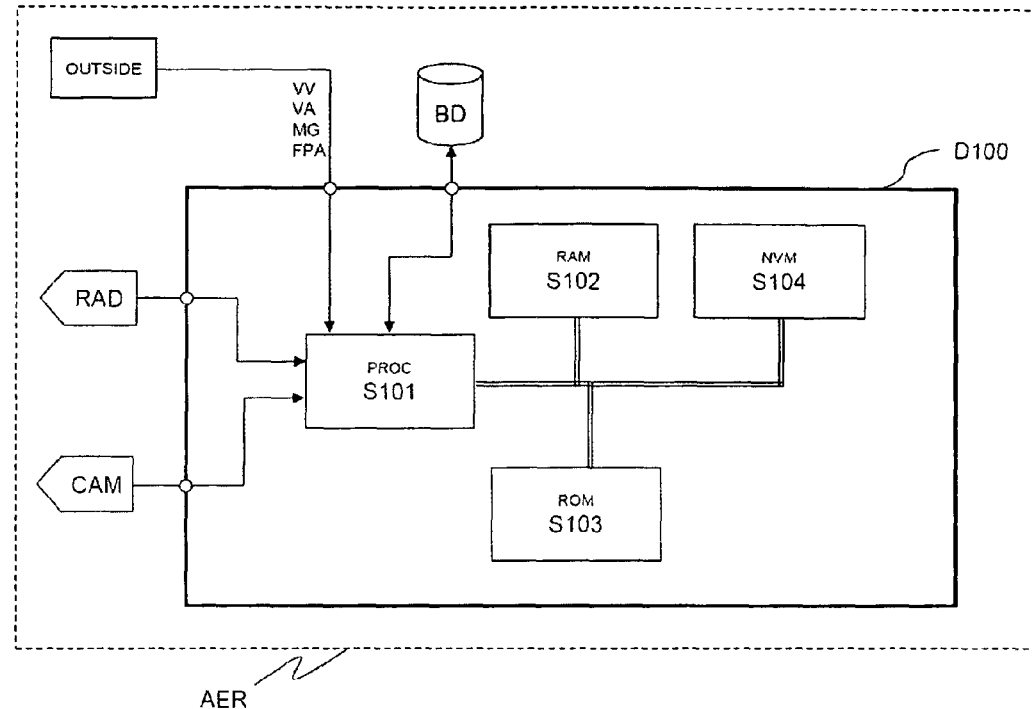
FIG. 1 is a diagrammatic illustration of an aircraft in accordance with an exemplary embodiment.
Figure 1:
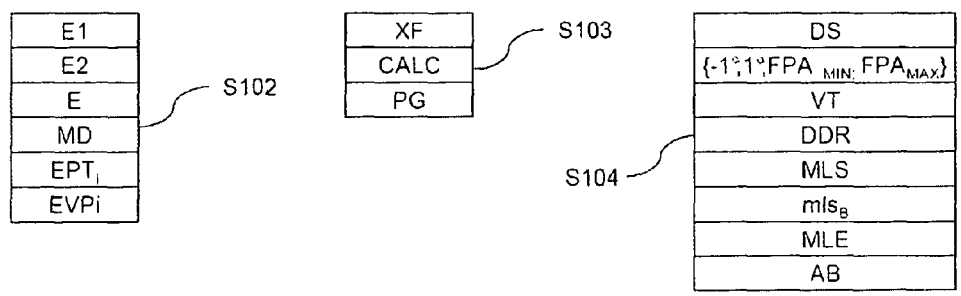

In one exemplary embodiment, a method and device for detecting obstacles that does not have the aforementioned drawbacks is disclosed. More specifically, the invention relates to a method for detecting potential collisions that can be implemented in an aircraft equipped with at least one sensor able to supply a distance and angle of an object detected by said sensor relative to a reference location of the aircraft. The method may include:

a step for obtaining a first set of points from certain obstacles detected by each of the sensors;

a step for creating a set of points by the union of the first sets of points;

a step for obtaining a mode for detecting potential collisions using at least the speed of the aircraft and a guiding mode of the aircraft;

a step for obtaining a set of transformed points obtained by applying a transformation selected as a function of the detection mode to the set of points; and a step for calculating at least one protective envelope, the calculation method being chosen according to the detection mode, the potential collisions detected by that method corresponding to the obstacles associated with the transformed points comprised in at least one of the envelopes.

Similarly, the disclosure relates to a device for detecting potential collisions that can be onboard an aircraft equipped with at least one sensor able to provide a distance and angle of an obstacle detected by said sensor relative to a reference location of the aircraft. The device may include:

means for obtaining a first set of points from some of the obstacles detected by each of the sensors;

means for creating a set of points through the union of the first sets of points;

means for obtaining a potential collision detection mode using at least the speed of the aircraft and a guiding mode of the aircraft;

means for obtaining a set of transformed points obtained by applying a transformation selected according to the detection mode to that set of points; and means for calculating at least one protective envelope, the calculation means being chosen according to the detection mode, the potential collisions detected by that device corresponding to the obstacles associated with the transformed points comprised in at least one of the envelopes.

The disclosure also relates to an aircraft, for example a helicopter, incorporating a device as mentioned above, according to some embodiments. A sensor may be made up of a radar, a camera, or other sensor, according to various embodiments.

In one embodiment, to obtain the potential collision detection mode, binary information is used indicating whether the aircraft is in flight in formation, in addition to the speed of the aircraft and the guiding mode of the aircraft. In one embodiment, the potential collision detection mode is selected from amongst a finite set of predetermined modes. The disclosed method and detection device may be more reliable than method based on detecting obstacles declared in a database, since they take into account all actual obstacles that can be detected by a sensor.

In some embodiments, a set of points may be used, thereby offering a more fine granularity than in a TAWS system, which may be limited by the resolution of the geometry of the terrain elevation cells. For example, the protection envelopes calculated using the techniques described herein may also take into account the speed of the aircraft and the guiding mode. Taking the speed of the aircraft into account makes it possible to define a low-speed protective envelope and a high-speed protective envelope. Furthermore, taking the guiding mode into account allows a more subtle detection and makes it possible to decrease the number of false alarms. All of these features contribute to obtaining a system in which the number of false alarms is considerably reduced.

In one embodiment, the sensor may also provide an elevation of the detected obstacle relative to the reference location of the aircraft. In such an embodiment, the step for obtaining the first set of points may be done by selecting points whereof the elevation is included in the vertical sector depending on the geometric angle of vertical movement of the aircraft. This feature makes it possible to select only the relevant obstacles relative to the vertical evolution of the aircraft and therefore to drastically reduce the number of false alarms.

In one embodiment, the aircraft also includes means for accessing a database of declared obstacles and the obstacle detection method may include a step for obtaining a second set of points from obstacles declared in the database and situated near the aircraft. The detection method may also include a step for adding the points of the second set of points to the aforementioned union set before the step for obtaining the transformed points. The techniques disclosed make it possible to enrich the set of detected obstacles with the obstacles declared in the database. This feature makes it possible to make the disclosed techniques compatible with database-based systems. For example, such an option may be favored when the databases are precise and up-to-date enough to prevent false alarms from being generated.

In one embodiment, the calculation step makes it possible to obtain an inner protective envelope and an outer protective envelope encompassing the inner protective envelope. The inner protective envelope nay, for example, be dimensioned to correspond to a zone in which the potential collisions are so close that they put the aircraft in danger. The outer protective envelope may, for example, be obtained from the inner protective envelope by scaling. An envelope may be used to visualize obstacles in the area around the aircraft or to evaluate the lateral distance remaining before an alarm.

In one embodiment, the detection method may include a step for returning a signal representative of the spatial position of the transformed points corresponding to a potential collision in at least one envelope. In one embodiment, the detection method may include a step for generating at least one alarm when at least one potential collision is detected. The method may be used to generate different alarms depending on whether the potential collision corresponds to a transformed point comprised in an inner protective envelope or an outer protective envelope. The restored signal may be, for example, a visual signal, such as a light or display making it possible to show the position of the potential collisions in the different envelopes. When several envelopes are used, a color code, cross-hatching, or a texture can be chosen to make it easier to differentiate between the inner and outer envelopes. A sound signal may be used, as in a manner similar to backup radars for automobiles, i.e., the frequency or volume of that signal varying as the potential collision comes closer to the border of the envelope. When the aircraft is equipped with stereophonic sound systems (speaker systems, headphones, etc.), these can be used to produce a directional sound.

In one embodiment, the detection method may include a step for inhibiting the alarm for the points comprised in the outer envelope in at least one of the following situations: in case of voluntary action by the flight crew, when the aircraft is at an altitude higher than an altitude defined by the flight crew, or when the aircraft is in the approach phase. This inhibition mode makes it possible not to disrupt the pilot or the flight crew when the real risk of collision is null or practically null. This embodiment makes it possible to ensure that an alert will be generated in case of proven risk of collision, including if the inhibition mode has been implemented.

In one embodiment, the transformation used to obtain the set of transformed points may be an expansion in radial distance aiming to bring the points of that set radially toward the aircraft when the aircraft moves at a speed above a threshold speed. The expansion coefficient may be, for example, a safety margin corresponding to the distance from the contour of the vehicle. In one preferred embodiment, the transformation used to obtain the set of transformed points may take into account the speed of the wind when the aircraft moves at a speed below a threshold speed. In one embodiment, the transformation used to obtain the set of transformed points when the aircraft moves at a speed below a threshold speed may include: obtaining the set of transformed points while considering that the aircraft is moving at a speed above the threshold speed, and applying a transformation to the latter that offsets the effect of the wind and a safety margin. These features make it possible to obtain a detection system that is much more reliable than a TAWS system at very low speeds, or even when lifted at a fixed point, since the latter is not able to take the wind into account in its calculations. At low speeds, aircrafts are excessively maneuverable and can in particular turn around themselves; the wind speed becomes dominating to the detriment of the trajectory. The described techniques make it possible to bring the obstacles situated on the other side of the aircraft in relation to the wind direction virtually closer to the aircraft.

In one embodiment, the mode for calculating the protective envelope may take into account at least the geometry of at least part of the aircraft and a first safety margin when the aircraft moves at a speed below a threshold speed. When the aircraft is a helicopter, the considered part can for example be the rotor of the tail of that helicopter. The first safety margin can in particular be chosen according to the speed allowing the aircraft to lift at a fixed point. This calculation makes it possible to determine lateral protection volumes, which the TAWS system may be incapable of doing. The invention can thus be used to provide information making it possible to determine whether an obstacle can be avoided using a lateral maneuver.

In one embodiment, the mode for calculating the protective envelope may take into account at least the wind speed, the speed of the aircraft, and a second safety margin when the aircraft moves at a speed above a threshold speed. It is in fact considered that, when the aircraft moves quickly enough, it can perform a lateral maneuver at any time, the latter depending on its speed and that of the wind. A circular trajectory of the aircraft in the absence of wind may deform in a cycloid under the effect of the wind. When an inner envelope and an outer envelope are used, the inner envelope may, for example, be chosen as the ellipse encompassing as closely as possible the cycloids corresponding to the right and left lateral maneuvers, the speed of the aircraft and the wind being taken into account. The outer envelope may, for example, be obtained by applying a second safety margin to maintain a fixed distance between the aircraft and the potential collisions.

In one embodiment, the potential collision detection mode is such that the mode makes it possible to obtain transformed points adapted to an aircraft moving at a low speed and at least one protective envelope adapted to an aircraft moving at a low speed when the aircraft moves at a speed below a threshold speed. The mode may make it possible to obtain transformed points adapted to an aircraft moving at a high speed and at least one protective envelope adapted to an aircraft moving at a high speed when the aircraft moves at a speed above that threshold speed, the guiding mode being an automatic pilot guiding mode along a route on the ground or a flight computer guide mode along a route on the ground. The mode may make it possible to obtain transformed points adapted to an aircraft moving at a low speed and at least one protective envelope adapted to an aircraft moving at a high speed when the aircraft moves at a speed above the threshold speed, the guide mode being a guide mode according to a heading or manual guiding. In some implementations, the different steps of the potential collision detection mode may be determined by instructions from computer programs executed by a processor. As a result, the disclosure also relates to a computer program on an computer-readable medium, the program being able to be implemented by a computer, said program including instructions adapted to the implementation of steps of the potential collision detection method as mentioned above. The program can use any programming language, and be in the form of source code, object code, or an intermediate code between source and object code, such as in a partially compiled form, or in any other desirable form. The disclosure also relates to an information medium readable by a computer, and including computer program instructions as mentioned above. The information support may be any entity or device capable of storing the program. For example, the medium may include a storage means, such as a ROM, for example a CD ROM or a microelectronic circuit ROM, or a magnetic recording means, for example a floppy disk or a hard disk. The information medium may also be a transmissible medium such as an electric or optical signal, which can be conveyed via an electric or optical cable, by radio or other means. The program according to the invention can in particular be downloaded on an Internet-type network. The information medium may be an integrated circuit in which the program is incorporated, the circuit being adapted to execute or to be used in the execution of the functions disclosed herein.

FIG. 1 illustrates an aircraft AER, according to an exemplary embodiment. Aircraft AER includes a device D100 for detecting potential collisions, according to various implementations. The aircraft AER may include two sensors, i.e. a radar RAD and a camera CAM. Each of these sensors RAD, CAM is able to provide a distance and an angle of the obstacles it detects relative to a reference location of the aircraft AER. As an example, the radar RAD can be a laser radar, a shortwave radar, or a pulse radar. The camera CAM can be a stereoscopic camera in the visible spectrum or in the infrared spectrum. It is also possible to use a laser camera.

Device D100 may a processing circuit configured to detect obstacles. In particular, device D100 may include a processor S101, a random-access memory such as RAM S102, a read-only memory such as ROM S103, and/or a rewritable non-volatile memory S104 interconnected by a bus. Device D100 may also include an input associated with each of the sensors and means for obtaining, from one or more outside devices, the wind vector VV, the speed of the aircraft VA, the geometric angle FPA of the vertical movement of the aircraft, and the guiding mode MG of the aircraft. Read-only memory S103 may constitute a recording medium, according to some embodiments. This recording medium can be read by processor S101 and include instructions for a computer program PG that, when executed by processor S101, cause processor S101 to perform the operations for collision detection described herein. For example, read-only memory 5103 may include a function module XF for transforming points and a function CALC for calculating protective envelopes. Random-access memory S102 may also include a certain number of registers for storing the variables necessary to implement the operations described herein.

Figure 2:
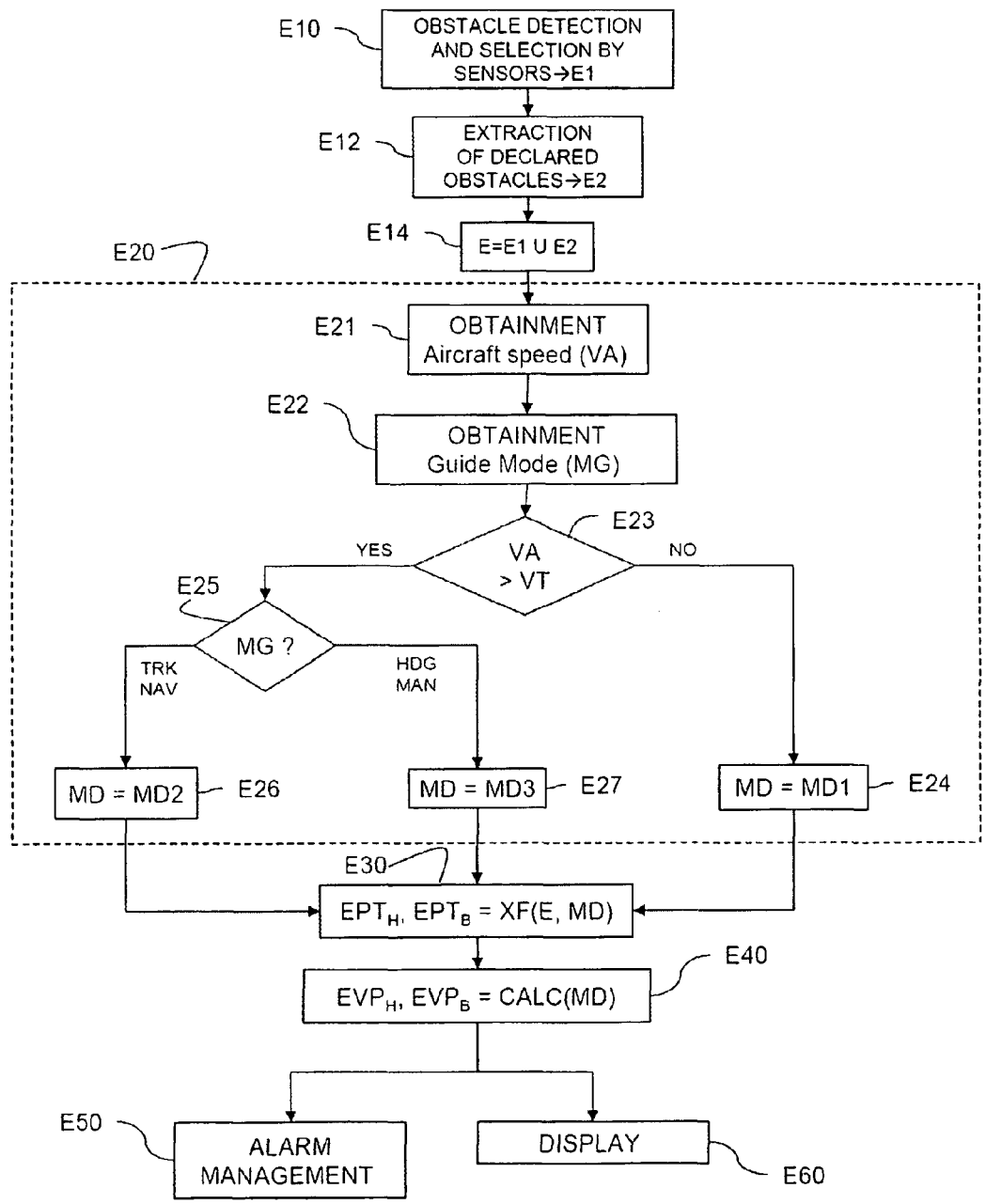
FIG. 2 shows a flowchart of a method for detecting a potential collision, according to an exemplary embodiment.

FIG. 2 shows a flowchart of a method for detecting a potential collision, according to an exemplary embodiment. The method may be implemented, for example, by device D100 of FIG. 1, or any other computing device. In the embodiment described here, the method includes a step E10 for obtaining and possibly selecting a set of points E1 from obstacles detected by the radar RAD and the camera CAM. In this example, the set E1 may include all of the points detected by the camera CAM and a selection of points corresponding to obstacles detected by the radar RAD, which will now be described with reference to FIG. 3.

Figure 3:
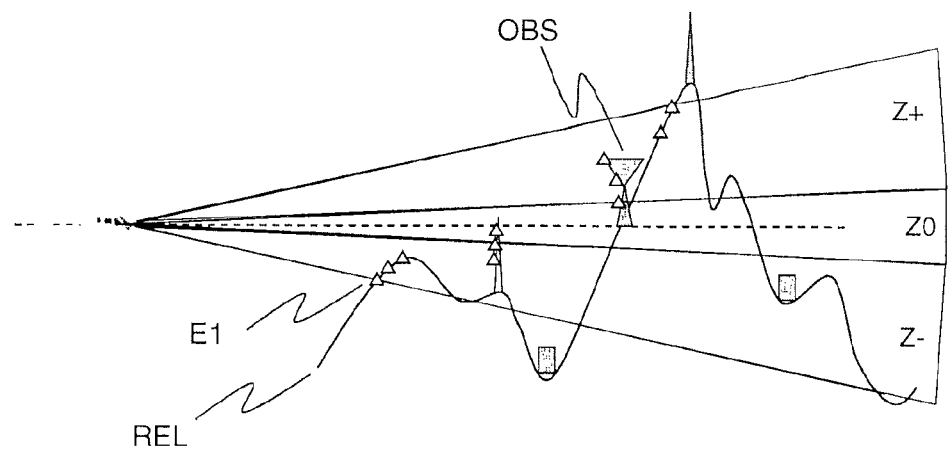
FIG. 3 is an illustration of points corresponding to obstacles detected by the sensors of the aircraft of FIG. 1.

FIG. 3 shows a vertical cross-sectional view of a relief REL including obstacles OBS detected by the radar RAD, according to an exemplary embodiment. In this example, a volume is shown corresponding to the space in which the aircraft AER can move, as a function of these rise and descent capacities. This volume includes three sub-volumes referenced Z+, Z0 and Z− respectively corresponding to:

[1°, $FPA_{MAX}$]: volume that can be reached during ascent for Z+;
[−1°, $FPA_{MIN}$]: volume that can be reached during descent for Z−;
[−1°, +1°]: volume that can be reached while cruising for Z0.

The values {−1°, +1°, $FPA_{MIN}$ et $FPA_{MAX}$} may be stored, for example, in rewritable non-volatile memory S104 or in another memory device. In this example, the device D100 may obtain, from outside devices, the current value FPA of the geometric angle of vertical movement of the aircraft and only adds to the set E1 the obstacles comprised in the volume Z+, Z− or Z0 corresponding to that value.

Aircraft AER may also includes means for accessing a database BD of declared obstacles (e.g., an obstacle database). In one embodiment, database BD may be stored in the aircraft AER, outside the device D100. Alternatively, it could be incorporated therein. The database BD could optionally be organized like a terrain elevation database of the TAWS type. In any case, this database BD includes the positions and elevations of so-called declared obstacles.

Step E10 may be followed by a step E12 during which the device D100 obtains a second set of points E2 from obstacles declared in the database BD corresponding to points situated close to aircraft AER. For example, a declared obstacle may be considered to be close to aircraft AER when it is located at a distance smaller than a threshold distance DS stored in memory S104 or in another memory device.

Figure 4:
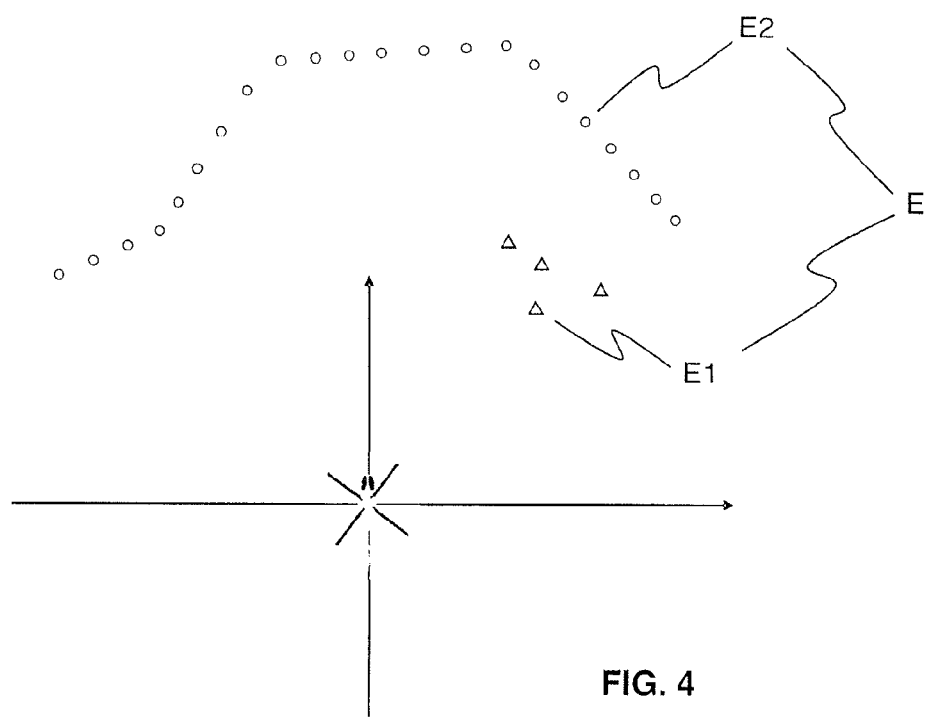
FIG. 4 shows all of the points taken into account, according to an exemplary embodiment.

Step E12 is followed by a step E14 during which the device D100 performs the union of the sets E1 obtained from each of the sensors (detected objects) and potentially a set E2 (declared obstacles). The result of step E14 is illustrated in FIG. 4. In cases where there is only one sensor and no database of declared objects, step E14 may be omitted.

In general, step E20 may comprise a number of sub-steps for obtaining a potential collision detection mode. According to some embodiments, step E20 may include one or more of sub-steps E21 to E27. During two first sub-steps E21 and E22 of step E20, the device D100 may obtain, from an outside device, the speed VA of the aircraft and the guide mode MG. Exemplary guide modes MG include:

an automatic pilot guide mode along a route on the ground (TRK mode);
a flight computer guide mode along a route on the ground (NAV mode);
a guide mode following a heading (HDG mode); or
a manual guide mode (MAN mode).

Step E20 may include a test E23 during which the device D100 compares the aircraft speed VA with a threshold speed VT stored, for example, in memory S104 or in another memory device. When the airspeed VA is below the threshold speed VT (e.g., as determined by testing step E23), step E23 may be followed by a step E24 during which a variable MD, is initialized at a value MD1. Value MD1 may be stored, for example, in random-access memory S102 or in another memory device. This value MD represents the detection mode. In certain cases, value MD is representative of a low-speed mode.

When the aircraft speed VA is above the threshold speed VT, testing step E23 may be followed by a testing step E25, during which device D100 compares the guide mode MG, obtained in sub-step E22, with the different possible modes. If the guide mode MG is TRK or NAV, testing step E25 may be followed by a step E26 during which the device D100 initializes the variable MD at a value MD2. This value MD (detection mode) is representative of a high speed along a route on the ground. If the guide mode MG is HDG or MAN, testing step E25 may be followed by a step E27 during which the variable MD is initialized at a value MD3. This value MD (detection mode) is representative of a high speed according to a heading.

Steps E24, E26 or E27 end the general step E20 for obtaining the detection mode, depending on the determinations made in testing steps E23 and E25. The general step E20 is followed by a step E30 during which the device D100 transforms the points of the set E, obtained in step E14, using the transformation XF stored in the ROM S103, the parameters of that transformation being chosen according to the detection mode. Alternatively, different transformations can be implemented.

Figure 5:
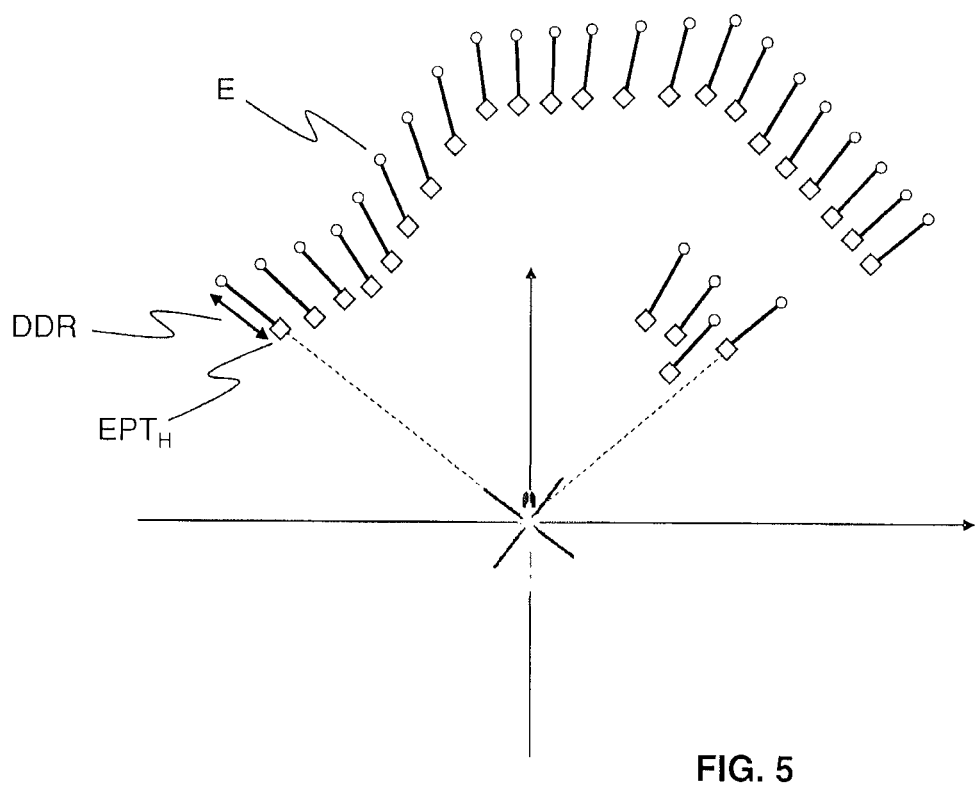
FIG. 5 shows a distance expansion of the points of FIG. 4, according to an exemplary embodiment.

According to one embodiment, when the detection mode MD is a high-speed mode MD2 or MD3, the device 100 performs a transformation XF illustrated in FIG. 5. Transformation XF operates, for each point of the set E, by obtaining a transformed point by radially expanding that point, relative to the aircraft AER, so as to bring that point closer to the aircraft. The expansion ratio DDR may then be stored in the memory S104, for example. The set of transformed points obtained for modes MD2, MD3 is denoted $EPT_H$. The set of transformed points may be stored in the random-access memory S102 (reference $EPT_i$), for example.

Figure 6A:
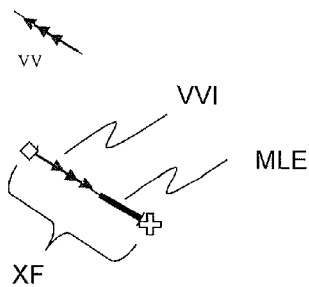
FIGS. 6A-6D show the obtainment of a set of points used in a low-speed detection mode under different conditions, according to an exemplary embodiment.
Figure 6B:
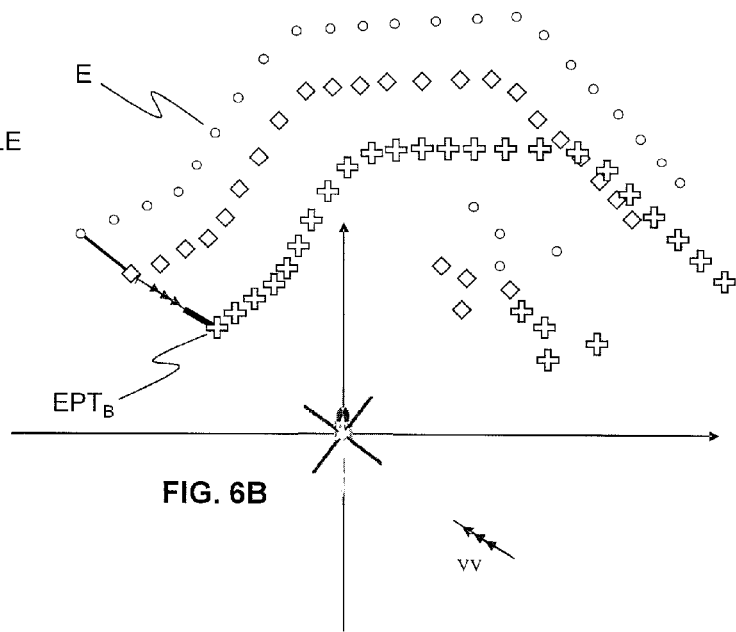

In some embodiments, when the detection mode MD is a low-speed mode MD1, the device 100 may perform a transformation XF illustrated in FIGS. 6A-6B. The transformation of FIGS. 6A-6B may comprise, for each of the points of set E, of the operation of obtaining an intermediate point by radially expanding said point, relative to the aircraft AER, so as to bring that point closer to the aircraft. The expansion ratio DDR may be stored in the memory S104, for example. The operations may also include obtaining a transformed point from that intermediate point, by applying a translation of the inverse wind vector VVI and a lateral avoidance margin MLE in the extension of that vector. Margin MLE may be stored, for example, in the memory S104. The set of transformed points obtained by the mode MD1 is denoted $EPT_B$ and may be stored, for example, in the random-access memory S102 (referenced $EPT_i$).

Figure 6C:
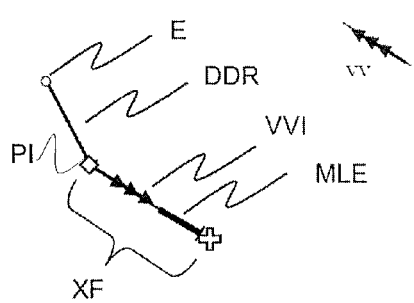
Figure 6D:
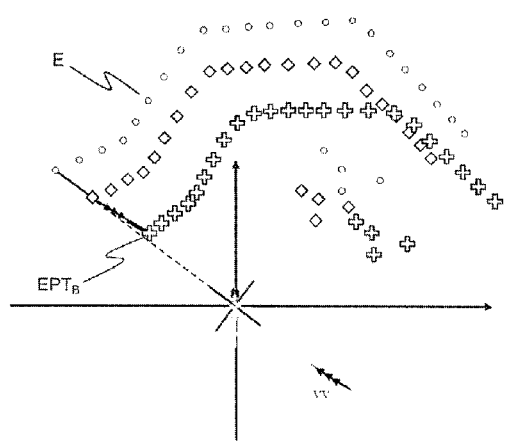

FIGS. 6C and 6D illustrate the obtainment of the set of transformed points in low-speed detection mode when the wind vector VV is nearly aligned with the direction of dilatation DDR, the PI point representing an intermediate point in the sense of the invention. Step E30 may be followed by a step E40 for calculating at least one protective envelope chosen according to the mode MD. In one embodiment, the device 100 may use the function CALC of the memory S103 to calculate to protective envelopes, i.e., an inner envelope and an outer envelope. The parameters of the function CALC may be chosen as a function of the detection mode MD.

Figure 7A:
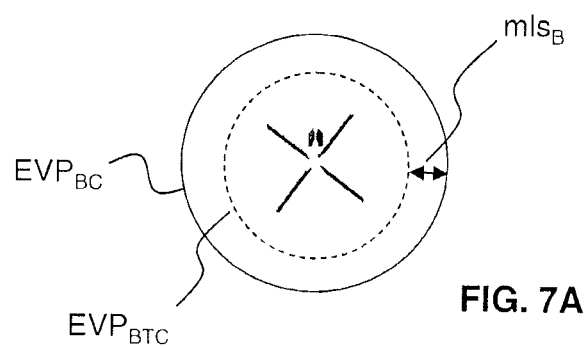
FIGS. 7A and 7B illustrate protective volumes for the low and high speeds, according to an exemplary embodiment.

In the low-speed mode MD1, protective envelopes are referenced $EVP_{BC}$ (outer envelope) and $EVP_{BTC}$ (inner envelope), as shown in FIG. 7A. The inner envelope takes into account the geometry of at least part of the aircraft with a margin mlsB stored in the memory S104, i.e., in this example the geometry of the entire aircraft. In this example, the outer envelope encompasses the inner envelope with a safety margin MLS which may be stored, for example, in the memory S104.

Figure 7B:
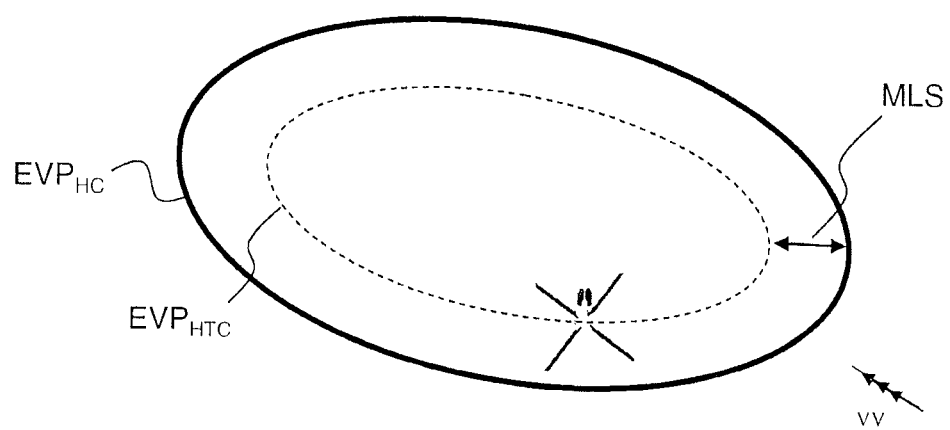

In high-speed modes MD2, MD3, the protective envelopes are referenced $EVP_{HC}$ (outer envelope) and $EVP_{HTC}$ (inner envelope), as shown in FIG. 7B. In this case, the inner envelope $EVP_{HTC}$ may be calculated as follows, using the calculation function CALC: the left/right lateral trajectories that the aircraft would have are determined, the turn radius of said trajectories being obtained, using an abacus AB stored in the memory S104, from the speed of the aircraft VA, in the absence of wind. Each of these trajectories is corrected by taking the wind vector VV into account; two cycloid arcs are thus obtained. The inner envelope $EVP_{HTC}$ is obtained as being the ellipse encompassing these two arcs as closely as possible. In this example, the outer envelope $EVP_{HC}$ encompasses the inner envelope $EVP_{HTC}$ with the safety margin MLS. The envelopes $EVP_i$ may then be stored, for example, in the random-access memory S102 or in another memory device.

Figure 8A:
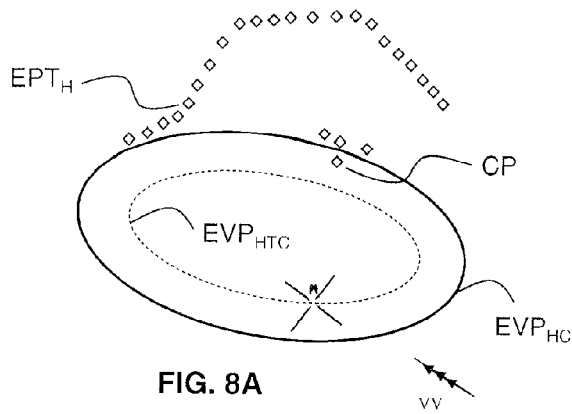
FIG. 8A to 8D show the points of FIG. 6B with the envelopes of FIGS. 7A and 7B, according to exemplary embodiments.
Figure 8B:
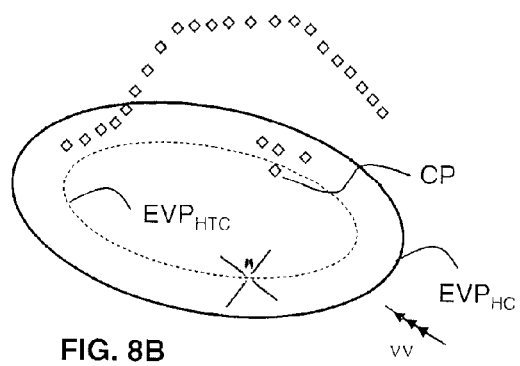
Figure 8C:
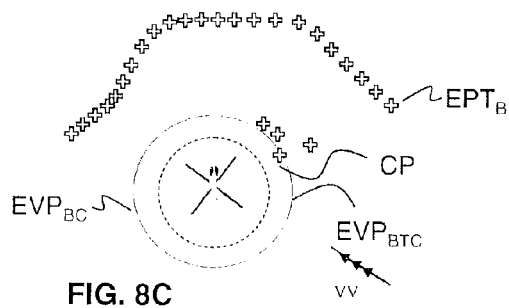
Figure 8D:
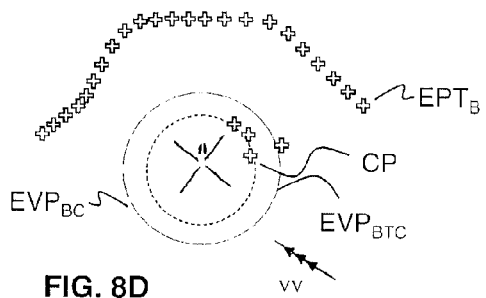

According to some aspects, the potential collisions detected by device D100 may correspond to the obstacles associated with the transformed points calculated in step E30 and comprised in at least one envelope calculated in step E40. These potential collisions CP are shown in FIGS. 8A-8D, each of these figures combining the set E of points of FIG. 4 with the envelopes: high-speed outer envelope $EVP_{HC}$ (FIG. 8A), high-speed inner envelope $EVP_{HTC}$ (FIG. 8B), low-speed outer envelope $EVP_{HC}$ (FIG. 8C), and low-speed inner envelope $EVP_{BTC}$ (FIG. 8D). In some embodiments, the device 100 may also be adapted to implement at least one alarm management routine (step E50) and/or a display routine (step E60), which will now be described.

Figure 9:
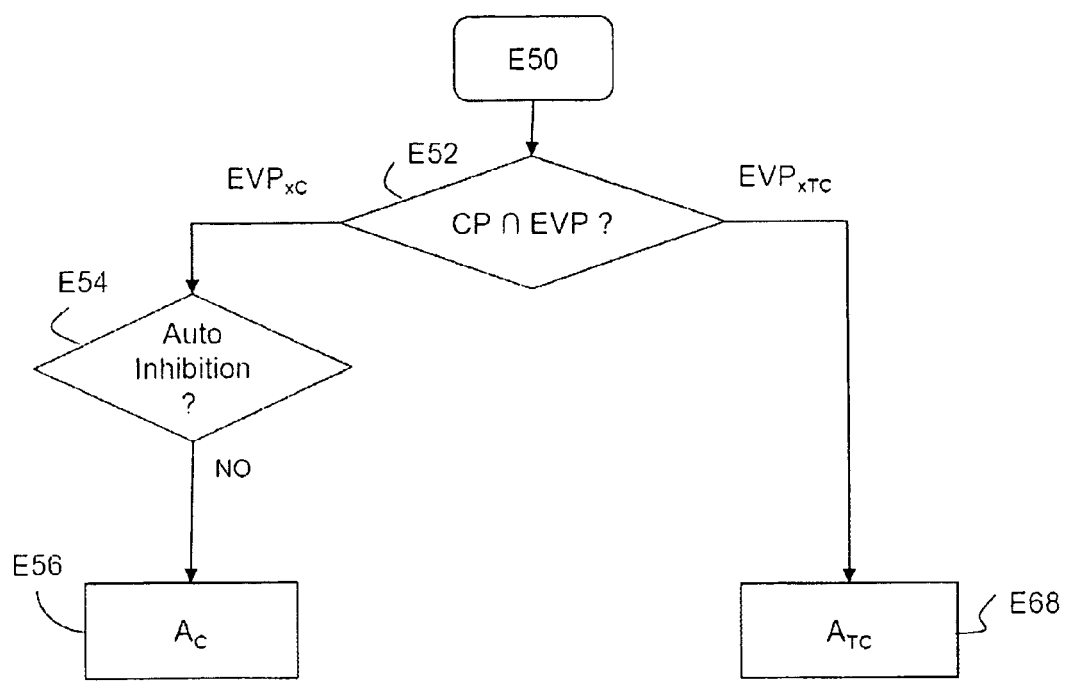
FIG. 9 shows a flowchart of a process for managing an alert, according to an exemplary embodiment.

The alarm management routine implemented in step E50 is illustrated by the flowchart of FIG. 9, according to an exemplary embodiment. Step E50 may include four sub-steps E52 to E58. In the embodiment described here, the inner envelopes correspond to areas of immediate danger, requiring an avoidance operation. The outer envelopes correspond to areas of nearby danger. Sub-step E52 makes it possible to determine whether a potential collision CP is comprised in an inner envelope or an outer envelope. In case of immediate danger, testing step E52 is followed by a step E58 for generating a visual and/or audio alarm $A_{TC}$ (e.g., on an electronic display, via a speaker, etc.). In the event the potential collision is situated in the outer envelope, a different alarm $A_C$ may be generated (step E56), unless the latter has been inhibited (testing step E54). In this example, the alarm AC can be inhibited only in the following cases: in case of voluntary action by the flight crew, when the aircraft is at an altitude higher than an altitude defined by the flight crew, or when the aircraft is in the approach phase.

In some embodiments, the method may include a step E60 for displaying, in image form, a visual signal representing the spatial position of the potential collisions CP in one or more envelopes $EVP_{HC}$, $EVP_{BC}$, $EVP_{HTC}$, $EVP_{BTC}$. Alternatively, it is possible to show the spatial position of the points corresponding to the detected and/or declared obstacles. Alternatively, another type of signal representative of the position of the potential collisions can be returned, for example audio.

Referring again to FIG. 1, the processor S101, the random-access memory S102, the read-only memory S103 and the rewritable non-volatile memory S104 of the device 100 thus constitute a processing circuit that is configured to:

obtain a first set of points E1 from certain obstacles detected by each of the sensors;

obtain a second set of points E2 from obstacles declared in the database BD;

create a set of points E through the union of the first and second sets of points;

obtain a potential collection detection mode MD by using at least the aircraft speed VA and a guide mode MG of the aircraft;

obtain a set of transformed points $EPT_H$, $EPT_B$ obtained by applying a transformation XF chosen according to said detection mode MD to said set of points E;

calculate at least one protective envelope $EVP_{HC}$, $EVP_{BC}$, $EVP_{HTC}$, $EVP_{BTC}$, the calculation mode CALC being chosen according to the detection mode MD;

manage the alarms and their restorations.

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures may show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A method for detecting potential collisions by an aircraft, the aircraft equipped with at least one sensor configured to supply data used to determine a distance and angle of an object detected by said sensor relative to a reference location of the aircraft, the method comprising:
    determining, by a processing circuit, a first set of points for obstacles detected by the at least one sensor;
    determining a union set of points as the union of the first sets of points;
    determining a detection mode for detecting potential collisions based on at least the speed of the aircraft and a guiding mode of the aircraft;
    determining a set of transformed points by applying a transformation to the union set of points, wherein the transformation is selected based on the determined detection mode, the transformation used to obtain the set of transformed points by adjusting the union set of points radially toward the reference location of the aircraft when the aircraft moves at a speed above a threshold speed;
    calculating at least one protective envelope around the reference location of the aircraft based on the determined detection mode; and
    detecting a potential collision based on whether a transformed point is within a protective envelope.

2. The method of claim 1, wherein said aircraft accesses an obstacle database, the method further comprising:
    retrieving, from the obstacle database, a second set of points using the reference location of the aircraft, wherein the union set of points further comprise the second set of points.

3. The method of claim 1, wherein the transformation used to obtain the set of transformed points takes into account the speed of wind when the aircraft moves at a speed below a threshold speed.

4. The method of claim 1, wherein the transformation used to obtain the set of transformed points applies an offset based on a safety margin and offsets the effect of wind, when the aircraft is moving at a speed above the threshold speed.

5. The method of claim 1, wherein the protective envelope is calculated based on a geometry of at least part of the aircraft and a first safety margin, when the aircraft moves at a speed below the threshold speed.

6. The method of claim 1, wherein the protective envelope is calculated based on at least wind speed, the speed of the aircraft, and a second safety margin, when the aircraft moves at a speed above the threshold speed.

7. The method of claim 1, wherein the first set of points is determined by selecting points based on the elevation of an obstacle relative to the geometric angle of vertical movement of the aircraft.

8. The method of claim 1, further comprising providing an alert based on whether a transformed point is within a protective envelope.

9. The method of claim 8, wherein calculating the at least one protective envelope comprises calculating an inner protective envelope and at least one outer protective envelope encompassing said inner protective envelope.

10. The method of claim 9, wherein the alert is generated based on whether a transformed point is within the inner protective envelope or the at least one outer protective envelope.

11. The method of claim 10, further comprising:
    inhibiting generation of an alert for the outer protective envelope, in response to receiving a request to inhibit generating an alert for the outer protective envelope.

12. A system for detecting potential collisions by an aircraft, the system comprising a processing circuit and at least one sensor configured to supply data to the processing circuit and used by the processing circuit to determine a distance and angle of an object detected by said sensor relative to a reference location of the aircraft, wherein the processing circuit is further configured to:
    determine a first set of points for obstacles detected by the at least one sensor,
    determine a union set of points as the union of the first sets of points,
    determine a detection mode for detecting potential collisions based on at least the speed of the aircraft and a guiding mode of the aircraft;
    determine a set of transformed points by applying a transformation to the union set of points, wherein the transformation is selected based on the determined detection mode, the transformation used to obtain the set of transformed points by adjusting the union set of points radially toward the reference location of the aircraft when the aircraft moves at a speed above a threshold speed, calculate at least one protective envelope around the reference location of the aircraft based on the determined detection mode; and detect a potential collision based on whether a transformed point is within a protective envelope.

13. The system of claim 12, wherein the processing circuit is further configured to retrieve, from an obstacle database, a second set of points using the reference location of the aircraft, wherein the union set of points further comprise the second set of points.

14. The system of claim 12, wherein the transformation used to obtain the set of transformed points takes into account the speed of wind when the aircraft moves at a speed below a threshold speed.

15. The system of claim 12, wherein the transformation used to obtain the set of transformed points applies an offset based on a safety margin and offsets the effect of wind, when the aircraft is moving at a speed above the threshold speed.

16. The system of claim 12, wherein the protective envelope is calculated based on a geometry of at least part of the aircraft and a first safety margin, when the aircraft moves at a speed below the threshold speed.

17. The system of claim 12, wherein the protective envelope is calculated based on at least wind speed, the speed of the aircraft, and a second safety margin, when the aircraft moves at a speed above the threshold speed.

18. The system of claim 12, wherein the first set of points is determined by selecting points based on the elevation of an obstacle relative to the geometric angle of vertical movement of the aircraft.

19. The method of claim 1, further comprising providing an alert based on whether a transformed point is within a protective envelope.

20. A system for detecting potential collisions by an aircraft, the aircraft equipped with at least one sensor configured to supply data used to determine a distance and angle of an object detected by said sensor relative to a reference location of the aircraft, the system comprising:

means for determining a first set of points for obstacles detected by the at least one sensor;

means for determining a union set of points as the union of the first sets of points;

means for determining a detection mode for detecting potential collisions based on at least the speed of the aircraft and a guiding mode of the aircraft;

means for determining a set of transformed points by applying a transformation to the union set of points, wherein the transformation is selected based on the determined detection mode, the transformation used to obtain the set of transformed points by adjusting the union set of points radially toward the reference location of the aircraft when the aircraft moves at a speed above a threshold speed;

means for calculating at least one protective envelope around the reference location of the aircraft based on the determined detection mode; and means for detecting a potential collision based on whether a transformed point is within a protective envelope.

* * * * *